United States Patent
Parthasarathy et al.

(10) Patent No.: US 10,673,757 B2
(45) Date of Patent: Jun. 2, 2020

(54) SYSTEM AND METHOD OF A DATA PROCESSING PIPELINE WITH POLICY BASED ROUTING

(71) Applicant: Arista Networks, Inc., Santa Clara, CA (US)

(72) Inventors: Prasanna Parthasarathy, Cupertino, CA (US); Sriharsha Jayanarayana, Bangalore (IN); Prashant Kumar, Bangalore (IN)

(73) Assignee: Arista Networks, Inc., Santa Clara, CA (US)

( * ) Notice: Subject to any disclaimer, the term of this patent is extended or adjusted under 35 U.S.C. 154(b) by 81 days.

(21) Appl. No.: 16/160,819

(22) Filed: Oct. 15, 2018

(65) Prior Publication Data
US 2019/0372895 A1 Dec. 5, 2019

Related U.S. Application Data

(60) Provisional application No. 62/680,894, filed on Jun. 5, 2018.

(51) Int. Cl.
| | |
|---|---|
| *H04L 12/745* | (2013.01) |
| *H04L 12/761* | (2013.01) |
| *H04L 12/931* | (2013.01) |
| *H04L 12/935* | (2013.01) |
| *H04L 29/06* | (2006.01) |

(52) U.S. Cl.
CPC .......... *H04L 45/748* (2013.01); *H04L 45/16* (2013.01); *H04L 49/205* (2013.01); *H04L 49/3063* (2013.01); *H04L 63/101* (2013.01); *H04L 63/20* (2013.01)

(58) Field of Classification Search
CPC ... H04L 63/20; H04L 49/3063; H04L 63/101; H04L 45/16; H04L 45/748; H04L 49/205; H04L 45/30–306; H04L 45/745–748
See application file for complete search history.

(56) References Cited

U.S. PATENT DOCUMENTS

| | | | | |
|---|---|---|---|---|
| 7,054,993 | B1* | 5/2006 | Srinivasan | G11C 15/00 365/49.18 |
| 7,110,407 | B1* | 9/2006 | Khanna | H04L 45/00 370/392 |
| 2004/0044868 | A1* | 3/2004 | Guerrero | H04L 45/7457 711/164 |
| 2006/0045088 | A1* | 3/2006 | Nguyen | H04L 45/00 370/392 |
| 2013/0301641 | A1* | 11/2013 | Anand | H04L 63/0227 370/389 |
| 2016/0112319 | A1* | 4/2016 | Hasani | H04L 45/748 370/392 |
| 2017/0366457 | A1* | 12/2017 | Wang | H04L 45/742 |

* cited by examiner

*Primary Examiner* — Mark H Rinehart
*Assistant Examiner* — Kenneth P Hunt
(74) *Attorney, Agent, or Firm* — Haley Guiliano LLP (57) ABSTRACT

A method and apparatus of a network element that processes data by a network element with a data processing pipeline is described. In an exemplary embodiment, the network element receives network data and performs a policy-based routing lookup using one or more characteristics of the network data to retrieve a next hop identifier. In addition, the network element generates a key for the next hop identifier and performs a longest prefix match lookup to retrieve a forwarding result. The network element further determines a next hop interface based on the forwarding result.

20 Claims, 9 Drawing Sheets

DATA PROC PIPELINE 202

SYSTEM AND METHOD OF A DATA PROCESSING PIPELINE WITH POLICY BASED ROUTING

RELATED APPLICATIONS

Applicant claims the benefit of priority of prior, co-pending provisional application Ser. No. 62/680,894, filed Jun. 5, 2018, the entirety of which is incorporated by reference.

FIELD OF INVENTION

This invention relates generally to data networking, and more particularly, to using a data processing pipeline for policy based routing.

BACKGROUND OF THE INVENTION

A network element can use policy-based routing (PBR) to make routing decisions based on policies set by the network administrator. When a network element receives a packet, the network element normally decides where to forward the packet based on the destination address in the packet, which is then used to look up an entry in a routing table. However, in some cases, there may be a need to forward the packet based on other criteria. For example, a network administrator might want to forward a packet based on the source address, the port the packet was received on, type of service and/or some other packet characteristic. Policy-based routing may also be based on the size of the packet, the protocol of the payload, or other information available in a packet header or payload. This permits routing of packets originating from different sources to different networks even when the destinations are the same and can be useful when interconnecting several private networks. Each different type of policy-based routing is mapped to a policy map.

The network element will store routing tables for different policy maps in different tables. Using separate tables for each of the different policy maps can lead to an inefficient use of the network element memory.

SUMMARY OF THE DESCRIPTION

A method and apparatus of a network element that processes data by a network element with a data processing pipeline is described. In an exemplary embodiment, the network element receives network data and performs a policy-based routing lookup using one or more characteristics of the network data to retrieve a next hop identifier. In addition, the network element generates a key for the next hop identifier and performs a longest prefix match lookup to retrieve a forwarding result. The network element further determines a next hop interface based on the forwarding result.

In a further embodiment, a network element that programs a longest prefix match lookup table with a data processing pipeline is described. In one embodiment, the network element receives policy-based routing forwarding information. In addition, the network element stores a policy-based routing entry in a policy-based routing lookup table based on the policy-based routing forwarding information. The network element further generates a key associated with the policy-based routing entry and stores a longest prefix match entry in a longest prefix match based on the key, wherein the longest prefix match entry includes a forwarding result.

Other methods and apparatuses are also described.

BRIEF DESCRIPTION OF THE DRAWINGS

The present invention is illustrated by way of example and not limitation in the Figures of the accompanying drawings in which like references indicate similar elements.

DETAILED DESCRIPTION

A method and apparatus of a network element that processes data by a network element with a data processing pipeline is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a network element that processes data by a network element with a data processing pipeline is described. In one embodiment, instead of using different routing tables for different policy maps for PBR instances, the network element creates special routing entries in the LPM lookup tables for different virtual routing and forwarding instances that used for the different PBR policies. In this embodiment, the network element creates a key for the LPM lookup table based on a PBR policy map identifier and an address indicator. The network element can use this key for a lookup in the LPM lookup table. In one embodiment, the key is formed by prepending an address indicator to the PBR policy map identifier. In one embodiment, the address indicator is value that is used to form a 32-bit IP address that can be used to store in the LPM lookup table. For example and in one embodiment, the address indicator is a 16-bit value of "224.0.". In this example, the address indicator is prepended onto the PBR policy map identifier, which creates a multicast address. In one embodiment, the last byte of the resulting 32-bit IP address is set to "0" so as to create a /24 prefix. This 32-bit IP address can be added to the LPM lookup table and can subsequently be used to match on a destination IP address. In one embodiment, by prepending a multicast address indicator to the PBR policy map identifier, a multicast address is formed. In one embodiment, the network element uses the key for a lookup in the LPM lookup table. A hit in the lookup leads to a forwarding result that can be used to determine a transmitting interface for the network data.

In addition, and in another embodiment, the network element can program entries in the PBR and the LPM lookup tables. In this embodiment, the network element receives PBR forwarding information, creates a PBR entry, and stores this entry in the PBR lookup table. The PBR entry includes a policy map identifier for the PBR entry. In addition, the network element uses this policy map identifier to create an entry for the LPM lookup table. In one embodiment, the network element creates a key for the LPM lookup table based on a PBR policy map identifier and an address indicator as described above.

Figure 1:
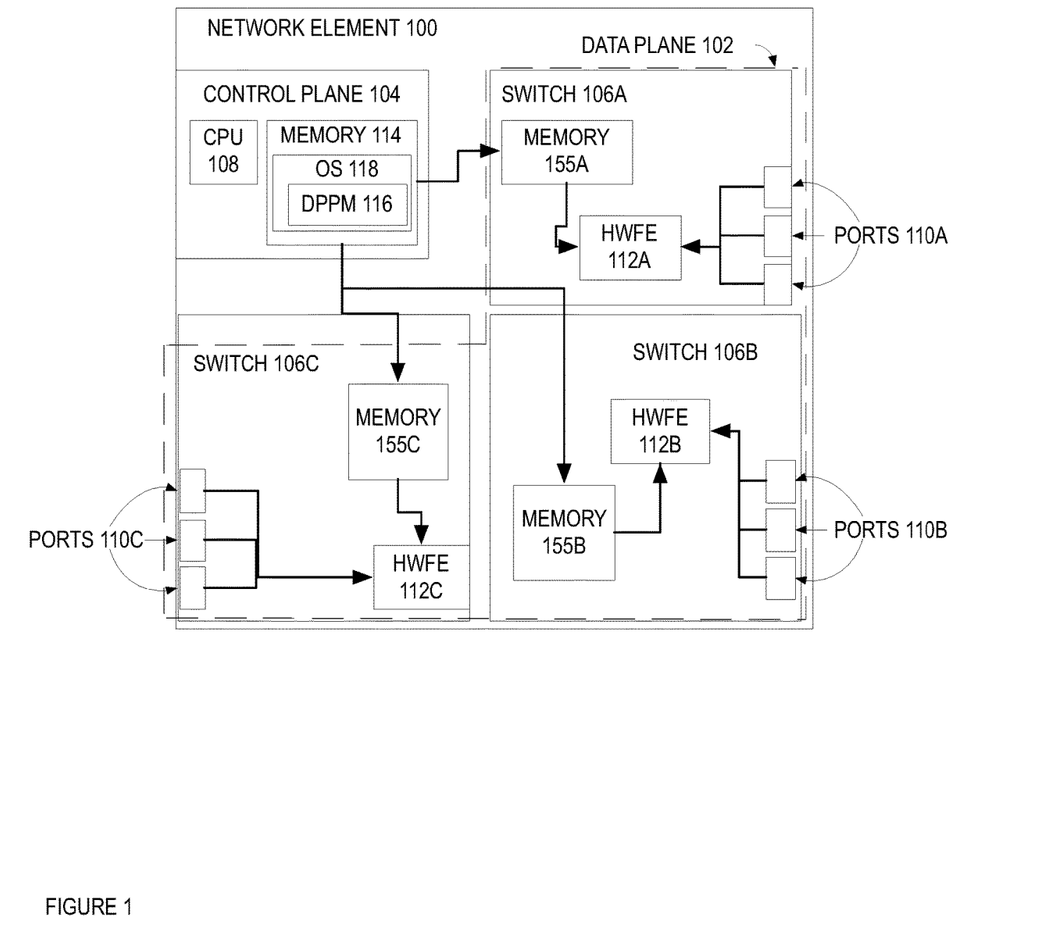
FIG. 1 is a block diagram of one embodiment of a network element that includes a control plane and a data plane.

FIG. 1 is a block diagram of one embodiment of a network element 100 that includes a control plane 104 and a data plane 102. In one embodiment, the data plane 102 receives, processes, and forwards network data using various configuration data (e.g. packet forwarding (routing, switching, or another type of packet forwarding), security, quality of service (QoS), and other network traffic processing information). For example, for each received packet of the network traffic, the data plane determines a destination address of that packet, looks up the requisite information for that destination in one or more memories 120A-C of data plane, and forwards the packet out the proper outgoing interface. The data plane 102 includes multiple switches 106A-C that can each receive, process, and/or forward network traffic. In one embodiment, each switch 106A-C includes a hardware forwarding engine 112A-C and ports 110A-C, respectively. In one embodiment, the network element 100 can be a switch, router, hub, bridge, gateway, etc., or any type of device that can communicate data packets with a network. In one embodiment, the network elements 100 can be a virtual machine.

In one embodiment, the control plane 104 includes central processing unit (CPU) 108. As discussed herein, CPU 108 is interchangeably referred to as a control plane processor of network element 100. The CPU 108 is used to process information for the control plane 104 and write configuration data for hardware forwarding engines 112A-C in the switches 106A-C. The information processed by CPU 108 includes, for example, control plane data corresponding to a plurality of different classes of control plane traffic, such as routing protocol messages, routing table messages, routing decisions messages, route update messages, unresolved traffic messages, L2 protocol messages, link aggregation control protocol messages, link layer state updates messages (e.g., spanning tree messages), link state update messages (e.g., link aggregation control protocol messages for a link aggregation group, bidirectional forwarding detection messages, etc.), exception packets that cannot be dealt with in hardware (e.g., router alerts, transmission time interval messages, maximum transmission size exceeded messages, etc.), program messages (e.g., packets from a controller instructing the programming of a network element), messages for routing table misses, time control messages (e.g., precision time protocol messages), messages for packets marked as being of interest for snooping (e.g., access control list logging and port mirroring messages), messages used to collect traffic diagnostics, address resolution messages (ARP) requests and replies, neighbor solicitation requests and replies, general communication to the control plane of the networking device, etc. CPU 108 processes the control plane network data to perform control management updates and/or respond with control message responses (e.g., routing decisions, protocol updates, traffic resolutions, etc.).

In one embodiment, the control plane 108 further includes memory 114 that includes operating system 118 that is executing various processes. In this embodiment, the processes are processes that execute the functionality of the control plane 104. In one embodiment, there can be processes for quality of service, access control lists management (or other types of security), policy service, fan agent, light emitting diode agent, temperature sensor agent, database service, management service(s), processes to support networking protocols (e.g. spanning tree protocol (STP), routing protocols (e.g. such as routing information protocol (RIP), border gateway protocol (BGP), open shortest path first (OSPF), intermediate system-intermediate system (IS-IS), interior gateway routing protocol (IGRP), enhanced IGRP (EIGRP), protocol independent multicast (PIM), distance vector multicast routing protocol (DVMRP), and any/or other type or unicast or multicast routing protocol), Multiprotocol Label Switching (MPLS), and/or other types of networking protocols), network flow management applications (e.g., openflow, directflow), process manager, and/or other types of processes for other types of functionality of the network element 100. In one embodiment, the operating system includes a data processing pipeline module 116 that controls the re-programming of the data processing pipeline described below. In one embodiment, the data processing pipeline module 116 can re-program the data processing pipeline by putting the data processing pipeline in a non-forwarding mode, using a standby memory, and/or using a standby data processing pipeline.

In one embodiment, the data plane 102 receives, processes, and forwards network data, including control plane network data, using various configuration data (e.g., forwarding, security, quality of service (QoS), and other network traffic processing information). The data plane 102 includes multiple switches 106A-C that can each receive, process, and/or forward network traffic. Each of the switches 106A-C includes multiple ports 110A-C that are used to receive and transmit network data.

In one embodiment, for each received unit of network data (e.g., a packet), the data plane 102 determines a destination address for the network data, looks up the requisite information for that destination in one or more tables stored in the data plane, and forwards the data out the proper outgoing interface, for example, one of the interface devices 106A-C. In one embodiment, each switch 106A-C includes one or more hardware forwarding engines (HWFE(s)) 112A-C and ports 110A-C, respectively. Each hardware forwarding engine 112A-C forwards data for the network element 100, such as performing routing, switching, or other types of network forwarding or processing.

Figure 2:
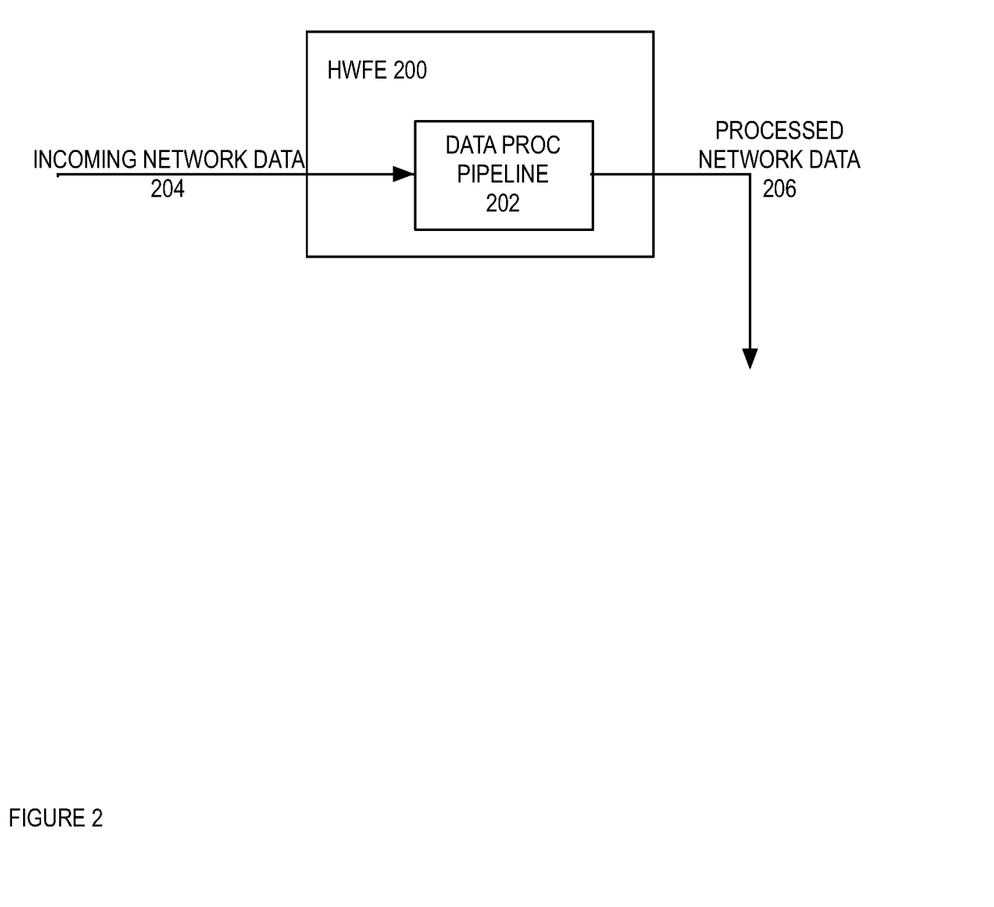
FIG. 2 is a block diagram of one embodiment of a hardware forwarding engine that includes a data processing pipeline.

FIG. 2 is a block diagram of one embodiment of a hardware forwarding engine 200 that includes a data processing pipeline 202 and memory 208. In one embodiment, the hardware forwarding engine 200 receives incoming network data 204, processes the incoming network data 204 using data processing pipeline 202, and outputs the processed network data 206. In this embodiment, the data processing pipeline 202 processes the incoming network data using one or more functionalities of the pipeline. In one embodiment, each of the functionalities can provide a different functionality, such as packet forwarding functionality (routing, switching, PBR, or another type of packet forwarding), security functionality (e.g., firewall, network address translation, access control lists, and/or other types of functionalities), QoS, traffic policing, network data re-write, and/or other network traffic processing functionalities. In one embodiment, the data processing pipeline is part of hardware and, in one embodiment, it is part of an Application-Specific Integrated Circuit (ASIC).

As described above, a problem with having a policy-based routing functionality is that each separate policy map corresponds to a separate table. This is because the traditional routing table, such as a longest prefix match (LPM) lookup table, is based on making routing decisions based on the destination IP address of the incoming network data. With PBR, the routing decisions can be made based on different network data characteristics, such as source IP address, the port the network data was received on, type of service, and/or some other network data characteristic. Using separate tables for each of the policy maps can lead to an inefficient use of the network element memory.

In one embodiment, instead of using separate tables for different policy maps, the network element uses a longest prefix match lookup table to store routing entries for PBR routed entries. In this embodiment, special entries are created and stored in the LPM lookup table for PBR routed entries, where these special entries do not overlap with the traditional destination IP based routing entries (e.g., destination IP based unicast routing entries).

Figure 3:
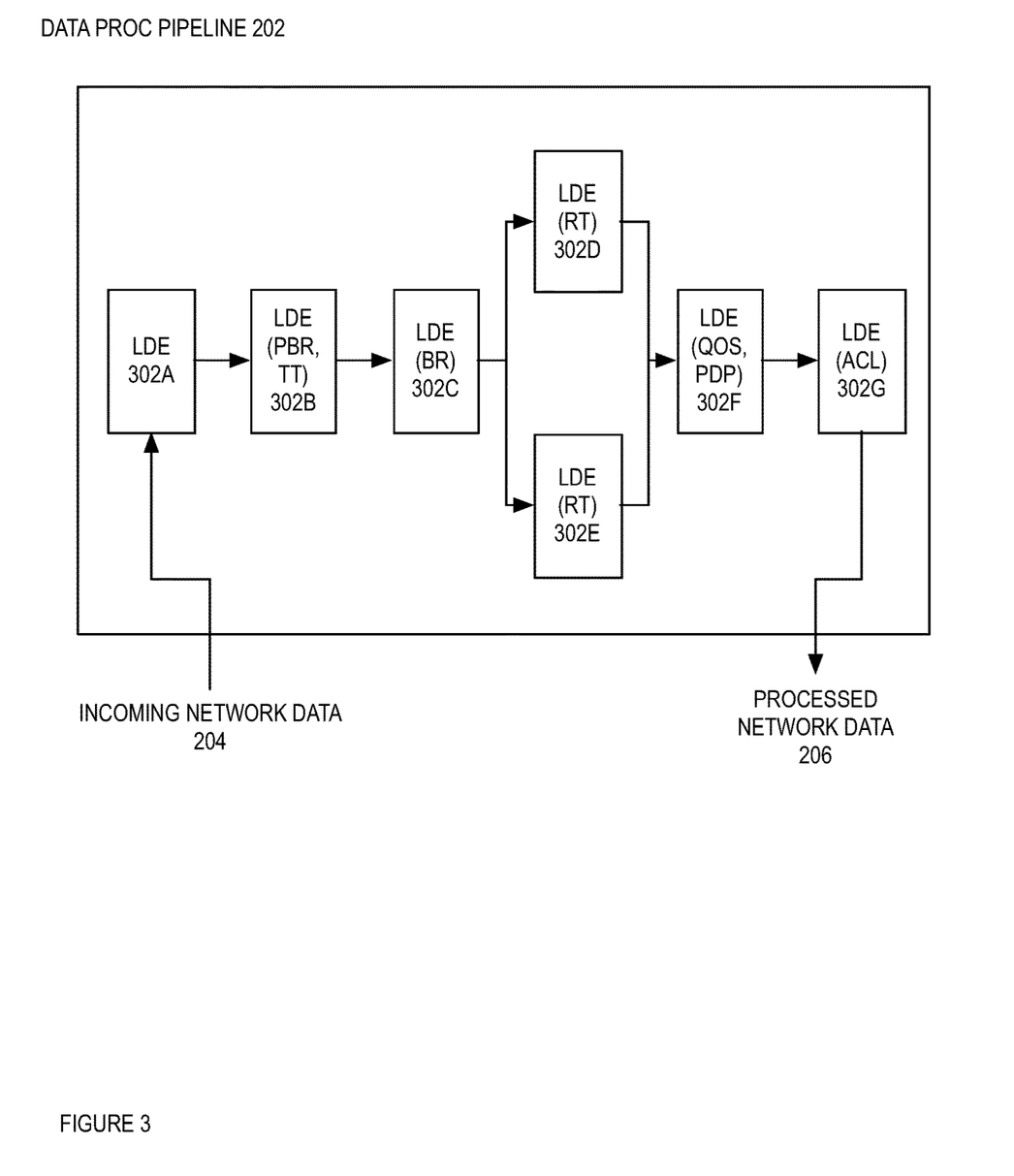
FIG. 3 is a block diagram of one embodiment of a data processing pipeline with policy-based routing functionality.

FIG. 3 is a block diagram of one embodiment of a data processing pipeline 200 with policy-based routing functionality. In FIG. 3, the data processing pipeline 200 includes several lookup and decision engines 302A-G. In one embodiment, each of the LDE 302A-G performs a function on the incoming network data. For example and in one embodiment, LDE 302B performs PBR. In one embodiment, PBR is forwarding mechanism to make routing decisions based on policies set by the network administrator. For example, and in one embodiment, a network administrator can setup for certain class of packets, such that these packets are forwarded using the source IP address or some other criteria of packet characteristics. In addition, the network element performs PBR lookups to determine a policy map for the network data. Furthermore, LDE 302C performs bridging, LDE 302D&E each perform routing, LDE 302F performs QoS and packet data protocol (PDP), and LDE 302G is used for ACL functionality. While in one embodiment, each LDE 302A-G is illustrated as a single LDE, in alternate embodiments, each of the LDE 302A-G may be one or more LDEs.

In one embodiment, the PBR entries are stored in a ternary content addressable memory (TCAM) for LDE 302B. In this embodiment, the network element issues a lookup in the LDE 302B to match on PBR TCAM entries. PBR TCAM entries are grouped together using a policy map identifier, which identifies a policy map for that TCAM entry. In one embodiment, the policy map identifier serves as a shared identifier for interfaces using the same policy-map.

In a further embodiment, once a PBR TCAM entry is hit, the network element reads the resulting next hop identifier associated with the PBR TCAM entry. The network element, in one embodiment, carries both the PBR Match flag (where this flag indicates whether any PBR TCAM entry is hit or not) and next hop identifier from LDE 302B to the routing LDEs, LDE 302D & E. In one embodiment, LDE 302D&E perform normal routing lookup in LPM and Host tables. In this embodiment, the routing LDEs 302D&E use destination IP address as a key for lookup in LPM and Host tables. Furthermore, the network element can re-use the routing functionality in LDE 302D&E for PBR. If PBR Match flag is set, the network element transforms the next hop identifier from the PBR lookup to a mapped address and uses this mapped address as a key to perform a lookup in LPM table in default virtual routing and forwarding (VRF) instance. In one embodiment, the mapped address is chosen such that the address does not overlap with any unicast IPv4 route.

In one embodiment, the network element programs the route in LPM table so that the network element can perform a route lookup in Host Table with the destination IP address. The result from Host Table lookup will be used in case the result from the LPM lookup table indicates that the Host Table result should be used (e.g. the LPM<lookup table results points to a ReceiveRoute (Self-IP)). Basically, network data sent to Self-IP address are sent to CPU even if the network element has a PBR rule to redirect it somewhere.

In order to have a hit in LPM lookup table, the network element programs route entries in LPM lookup table. The inserted entry has the mapped address as a key and configured PBR Nexthop address(es) as a result. In one embodiment, if there is a hit in the routing table, the remaining path for the network data in the data processing pipeline 200 uses the routing functionality of choosing the right egress virtual interface and rewrite information. In this embodiment, if the network data needs to be bridged, LDE 302C (bridging LDE) overrides the PBR routing decision. Furthermore, if there is a QoS ACL configured, corresponding actions (policing, marking, and/or other QoS actions) are performed by LDE 302F on the PBR routed network data. Similarly, ingress ACL and egress ACL actions are done in LDE 302G onwards on PBR routed network data. In either case, the network element still use the original destination IP for any lookups as destination IP field is not overwritten by PBR.

Figure 4:
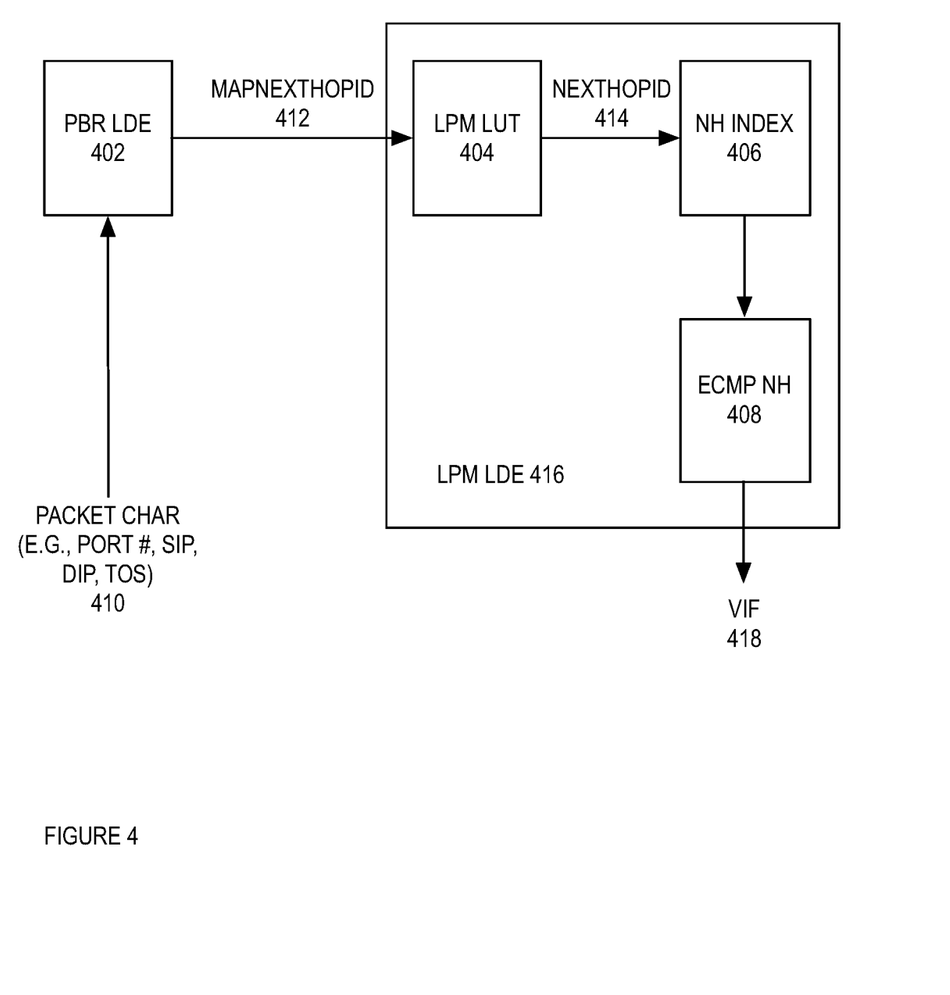
FIG. 4 is a block diagram of one embodiment of a policy-based lookup and decision engine (LDE) and a longest prefix match LDE.

FIG. 4 is a block diagram of one embodiment of a policy based lookup and decision engine (LDE) and a longest prefix match LDE. In FIG. 4, the PBR LDE 402 receives network data. In one embodiment, for each unit of network data, the PBR LDE 402 retrieves one or more characteristics of the network data that is used to perform a PBR lookup in the PBR LDE 402. In one embodiment, the PBR LDE 402 can use packet characteristics such as received port number, source IP address, destination IP address, type of service bit, Internet Protocol, Layer 4 port, application identifier, packet attribute, another packet characteristic, and/or a combination therein. In one embodiment, the PBR entries are stored in PBR TCAM. The network element issues a lookup in LDE1 to match on PBR TCAM entries. PBR TCAM entries are grouped together using a policy map identifier, where the policy map identifier identifies a policy-map. In one embodiment, the policy map identifier serves as a shared identifier for the interfaces that are using the same policy-map. In one embodiment, PBR LDE 402 applies to unicast routed packets.

With the resulting PBR entry in the PBR LDE 402, the network element reads the resulting next hop identifier from the PBR entry. This next hop identifier and the policy map identifier flags are forwarded to the LPM LDE 416. In one embodiment, the LPM LDE 416 includes an LPM LUT 404, NH Index 406, and ECMP NH 408. In this embodiment, the LPM LUT 404 is a lookup table (e.g., TCAM) that is used for longest prefix match lookups. In one embodiment, each entry in the LPM LUT 404 can include the pbdAclID, BD, IPv4 destination IP address, IPv4 source IP address, IP protocol, fragmented bit, source port, destination port, and type of service designation. In addition, this entry can further include Next hop identifier, pbrNoAction, and counterID. In one embodiment, the network element shares TCAM entries belonging to a policy-map if the same policy-map is applied on multiple routed interfaces or Switched Virtual Interfaces (SVI). The network element uses policy map identifier as sharing identifier and is part of the TCAM lookup key. In one embodiment, a policy map identifier is 6-bits. Hence, the network element can configure up to a maximum of 64 policy-maps. A policy map identifier is made part of PortVlanIvifTable and is derived in LDE0 and carried from LDE0 to LDE1 on scratchpad.

In one embodiment, with the next hop identifier from the PBR lookup, the Next hop identifier is used as a key to search in LPM table. Here are some of the points about Next hop identifier:

- A single Next hop identifier is used for each ACL rule. Hence, multiple TCAM entries (or subrules) created for each rule use the same Next hop identifier. However, if multiple classes use the same nexthop(s), they use different Ids.
- A next hop identifier is 16 bits long. The network element forms 32-bit IP address from this 16-bit value by pre-pending 224 to this id. Since 224* is a multicast address and the network element do not perform any search with the multicast address, a resulting LPM entry should not overlap with other LPM entries in the LPM table. When a PBR rule is programmed as NoAction, the network element programs a single bit in data portion of TCAM indicating it is a pbrNoAction. In this case, the network element increments the counter but set pbrMatchHit flag to 'false' in LDE1. Due to this, packet takes normal routing path in LDE1. In a further embodiment, the last byte of the address is set to 0 so as to create a /24 route and would be automatically added to LPM table. In one embodiment, the network element adds the route to LPM table so that the network element can perform a parallel host table lookup with the destination IP.

In one embodiment, the LPM lookup result is a forwarding indication that can be used to determine the interface used to transmit the network data. In one embodiment, the forwarding indication in an index into a NextHop Index 406. In one embodiment, the Nexthop Index 406 is an index between the result of the LPM lookup and interfaces or multilink groups (e.g. ECMP or LAG multi-link groups). If the LPM lookup result indicates that a multilink group is used, the network element uses the ECMP nexthop 408 functionality to determine which interface of the multilink group is to be used for transmitting the network data.

Figure 5:
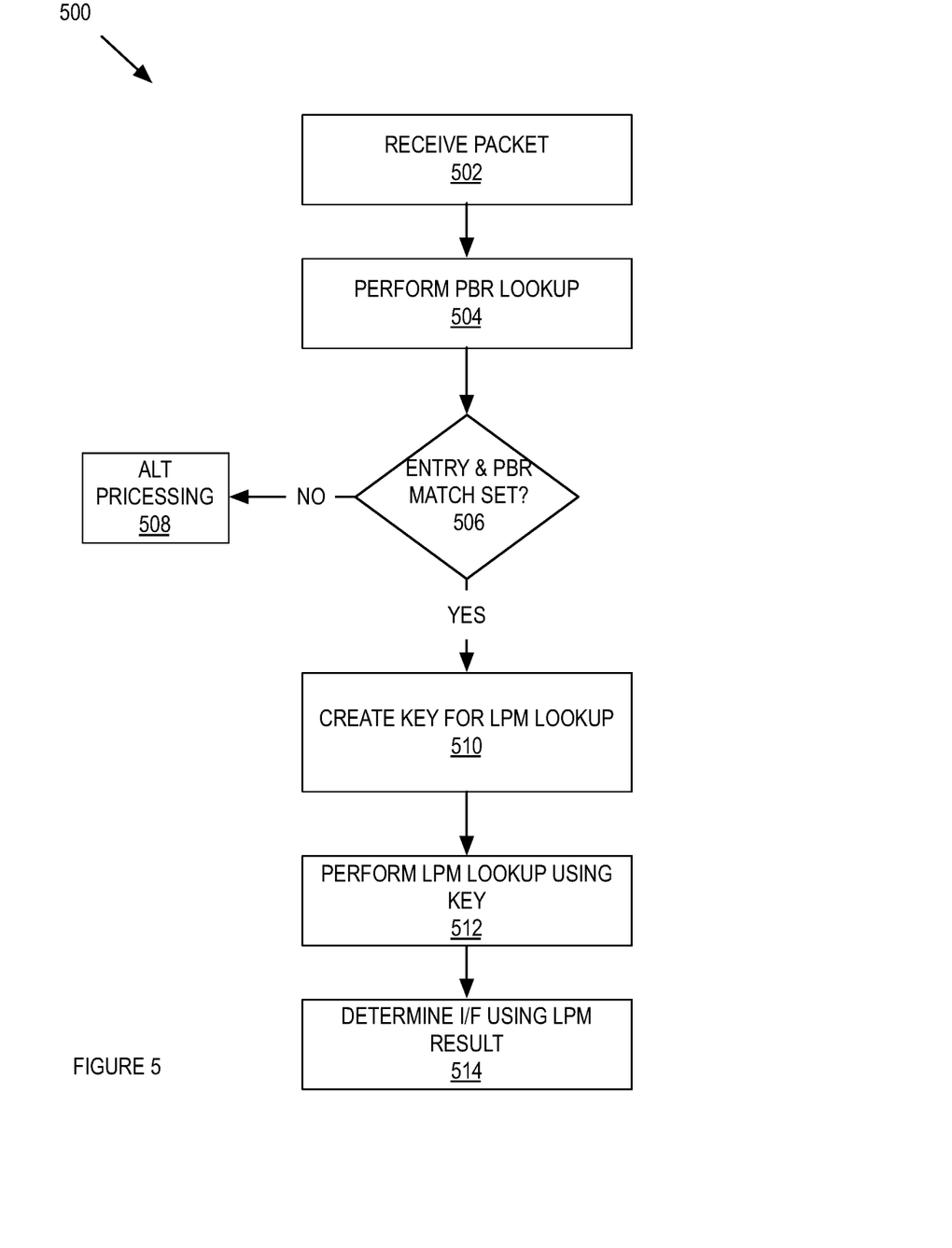
FIG. 5 is flow diagram of one embodiment of a process to determine an interface for a packet using policy-based routing.

FIG. 5 is flow diagram of one embodiment of a process 500 to determine an interface for a packet using policy-based routing In one embodiment, process 500 is performed by a data processing pipeline module to determine an interface for network data, such as the data processing pipeline module 116. In FIG. 5, process 500 begins by receiving the network data at block 502. In one embodiment, the network data is a packet. At block 504, process 500 performs a PBR lookup using one or more of the network data characteristics to determine if the network data should be processed using policy-based routing. In one embodiment, the network data characteristics can be port number, source IP address, destination IP address, type of service bit, another packet characteristic, and/or a combination therein. Process 500 determines if there is an entry in the PBR lookup that is a match for the network data characteristics at block 506. In one embodiment, there is a match if the one or more network data characteristics of the network data match an entry in the PBR lookup table. If there not a match, process 500 proceeds to block 508 for alternative processing. If there is a match, process 500 proceeds to block 510, where process 500 creates a key for the longest prefix match lookup. In one embodiment, the process 500 creates the key from the results of the PBR lookup (e.g., the next hop identifier as described in FIG. 3 above) and an address indicator. In one embodiment, the address indicator is value that is used to form a 32-bit IP address that can be used to store in the LPM lookup table. For example and in one embodiment, the address indicator is a 16-bit value of "224.0.". In this example, the address indicator is prepended onto the Next hop identifier, which creates a multicast address. In one embodiment, the last byte of the resulting 32-bit IP address is set to "0" so as to create a /24 route. This 32-bit IP address can be added to the LPM lookup table and can subsequently be used to match on a destination IP address. In one embodiment, by prepending a multicast address indicator to the Next hop identifier, a multicast address is formed. This can be stored in the LPM lookup table as the LPM lookup table as LPM will usually store unicast routes. Furthermore, the resulting 32-bit address is formed so that the resulting address does not overlap with one of the routes stored in the LPM lookup table. In one embodiment, by avoiding At block 512, process 500 performs an LPM lookup using the key. Process 500 determines the transmitting interface using the LPM result at block 514. In one embodiment, the LPM result is an index into a nexthop table that can be used to determine an ECMP interface as described in FIG. 3 above.

Figure 6:
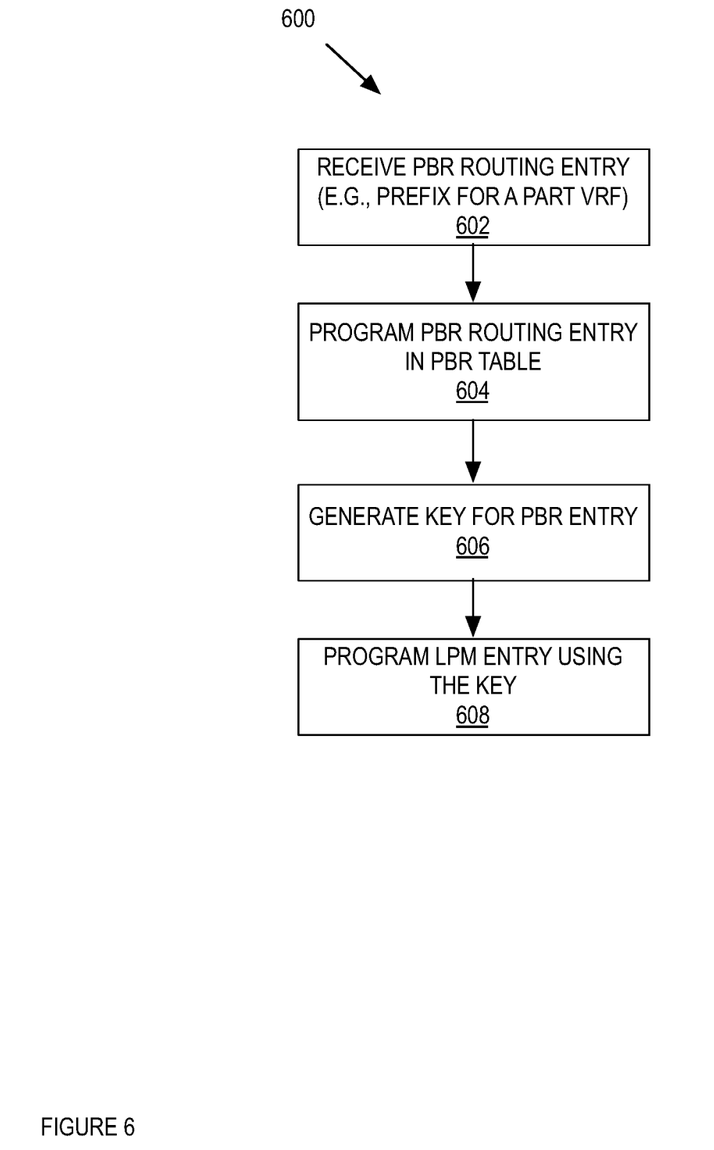
FIG. 6 is flow diagram of one embodiment of a process to program entries in the PBR and LPM lookup tables.

In FIG. 5 and in one embodiment, process 500 uses the PBR and LPM lookup tables to determine an LPM result, which can then be used to determine a transmitting interface. FIG. 6 is flow diagram of one embodiment of a process to program entries in the PBR and LPM lookup tables. In one embodiment, process 600 is performed by a data processing pipeline module to program entries in the PBR and LPM lookup tables, such as the data processing pipeline module 116 as described in FIG. 1 above. In FIG. 6, process 600 beings by receiving a PBR routing entry at block 602. In one embodiment, the PBR routing entry is that maps one or more network characteristics to a PBR policy map. At block 604, process 600 programs the PBR routing entry in the PBR lookup table. In one embodiment, the PBR lookup table is a TCAM and the PBR entry is an entry in the TCAM. Process 600 generates a key for the PBR entry at block 606. In one embodiment, process 600 generates the key by combining the policy-map identifier with an address indicator (e.g., a multicast address indicator as described above in FIG. 3). For example and in one embodiment, the address indicator is "224.0", which when combined with the policy-map identifier, creates a multicast address of the form "224.0.<policy-map-ID>.0/24". At block 608, process 600 programs the LPM entry using generated key. In one embodiment, process 600 programs a TCAM entry for the LPM lookup table using the generated key and an associated nexthop index. In this embodiment, the generated key is a type of address that does not overlap with other unicast routes that could be programmed into the LPM lookup table (e.g., the LPM stores unicast routes and the key is a multicast based address as described above).

Figure 7:
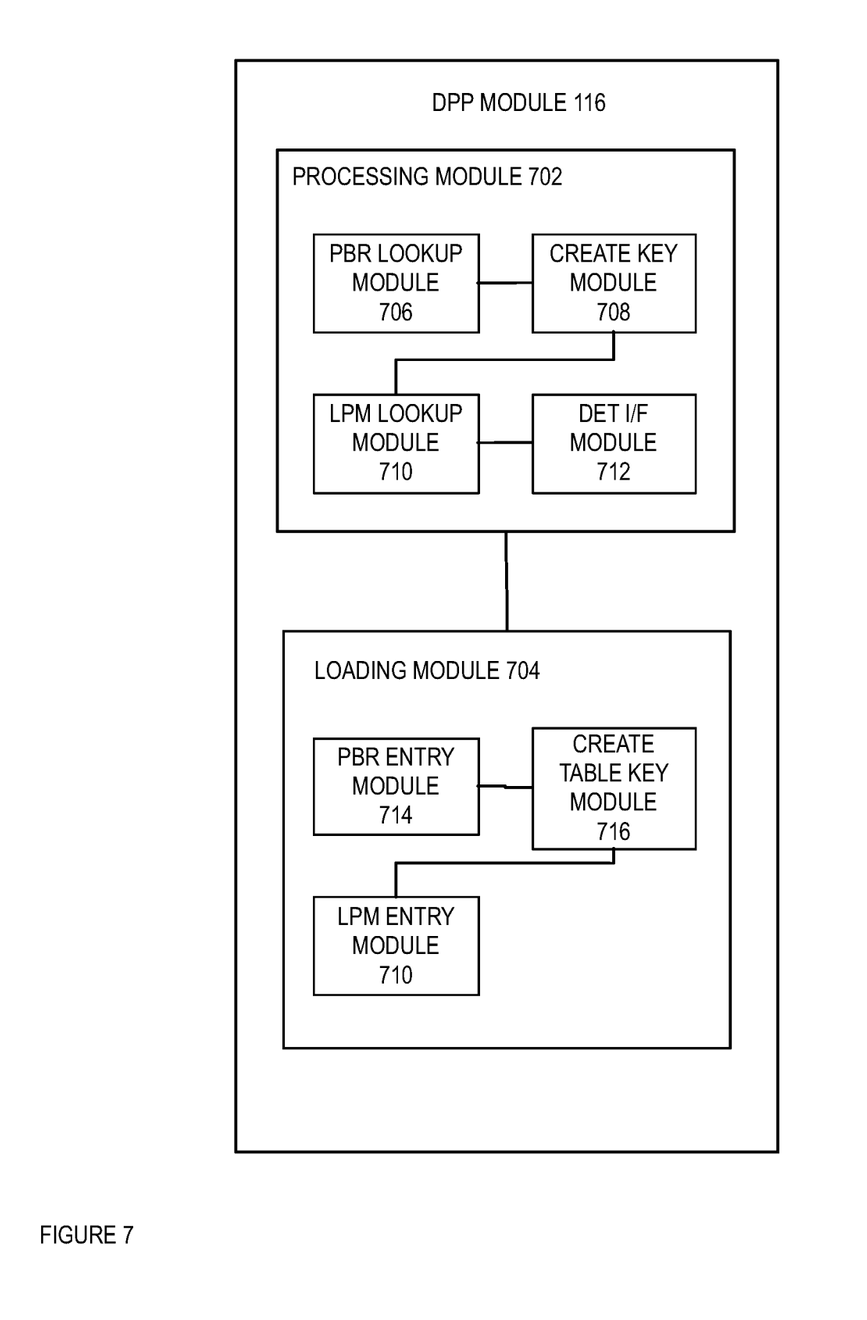
FIG. 7 is a block diagram of one embodiment of a data processing pipeline module that determines an interface for a packet using policy-based routing and programs entries in the PBR and LPM lookup tables.

FIG. 7 is a block diagram of one embodiment of a data processing pipeline module 116 that determines an interface for a packet using policy-based routing and programs entries in the PBR and LPM lookup tables. In one embodiment, the data processing pipeline module 116 includes a processing module 702 and a loading module 704. In one embodiment, the processing module 702 includes PBR Lookup module 706, Create Key module 708, LPM lookup module 710, and a Determine Interface module 712. In one embodiment, the loading module 704 includes PBR Entry module 714, Generate Table Key module 716, and LPM Entry module 718.

Figure 8:
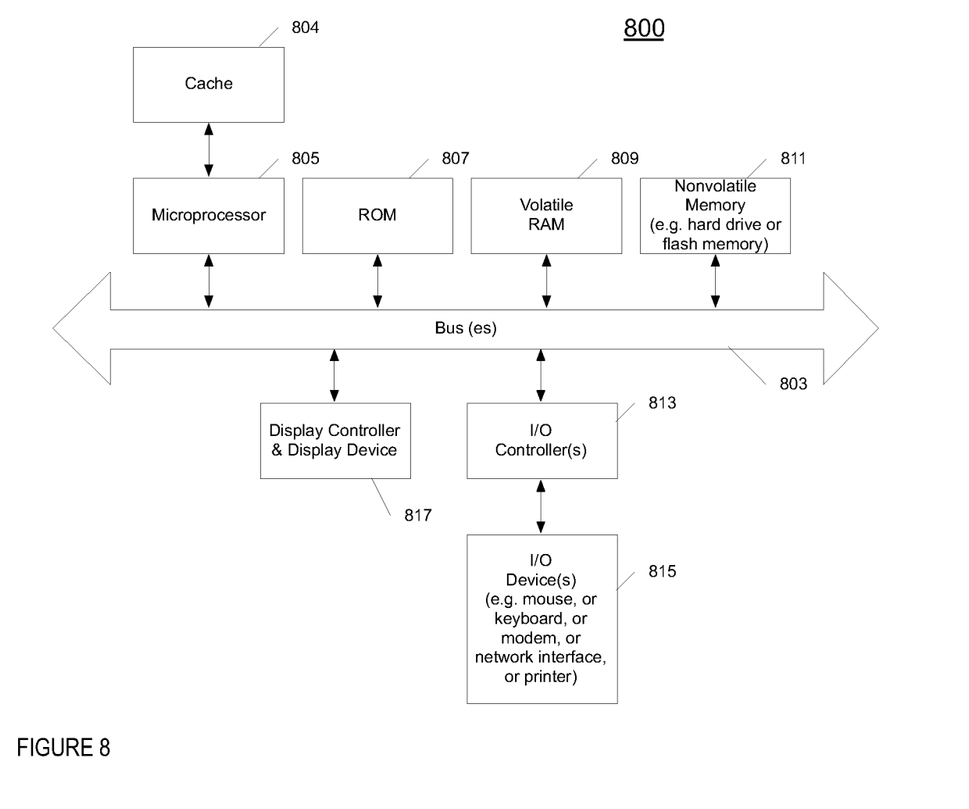
FIG. 8 illustrates one example of a typical computer system, which may be used in conjunction with the embodiments described herein.

As shown in FIG. 8, the computer system 800, which is a form of a data processing system, includes a bus 803 which is coupled to a microprocessor(s) 805 and a ROM (Read Only Memory) 807 and volatile RAM 809 and a non-volatile memory 811. The microprocessor 805 may retrieve the instructions from the memories 807, 809, 811 and execute the instructions to perform operations described above. The bus 803 interconnects these various components together and also interconnects these components 805, 807, 809, and 811 to a display controller and display device 817 and to peripheral devices such as input/output (I/O) devices which may be mice, keyboards, modems, network interfaces, printers and other devices which are well known in the art. In one embodiment, the system 800 includes a plurality of network interfaces of the same or different type (e.g., Ethernet copper interface, Ethernet fiber interfaces, wireless, and/or other types of network interfaces). In this embodiment, the system 800 can include a forwarding engine to forward network date received on one interface out another interface.

Typically, the input/output devices 815 are coupled to the system through input/output controllers 813. The volatile RAM (Random Access Memory) 809 is typically implemented as dynamic RAM (DRAM), which requires power continually in order to refresh or maintain the data in the memory.

The mass storage 811 is typically a magnetic hard drive or a magnetic optical drive or an optical drive or a DVD ROM/RAM or a flash memory or other types of memory systems, which maintains data (e.g. large amounts of data) even after power is removed from the system. Typically, the mass storage 811 will also be a random-access memory although this is not required. While FIG. 8 shows that the mass storage 811 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus, processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 9:
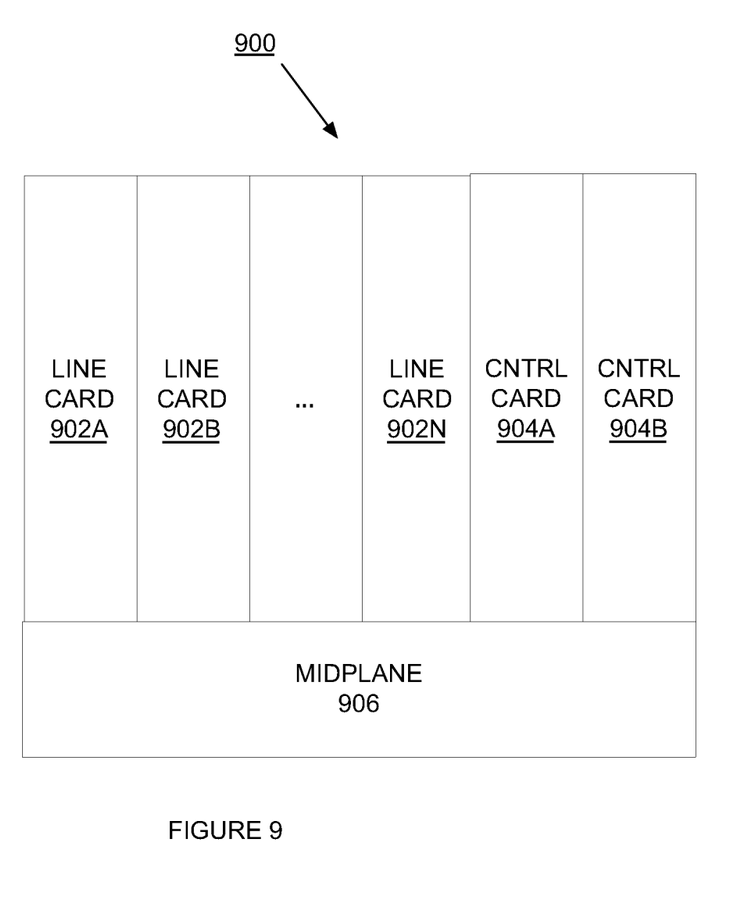
FIG. 9 is a block diagram of one embodiment of an exemplary network element that performs a hitless re-programming of the pipeline functionalities of the data processing pipeline.

FIG. 9 is a block diagram of one embodiment of an exemplary network element 900 that determines an interface for a packet using policy-based routing. In FIG. 9, the midplane 906 couples to the line cards 902A-N and controller cards 904A-B. While in one embodiment, the controller cards 904A-B control the processing of the traffic by the line cards 902A-N, in alternate embodiments, the controller cards 904A-B, perform the same and/or different functions (e.g., determines an interface for a packet using policy-based routing as described in FIGS. 3-6 above). In one embodiment, the line cards 902A-N processes network data. It should be understood that the architecture of the network element 900 illustrated in FIG. 9 is exemplary, and different combinations of cards may be used in other embodiments of the invention.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "performing," "generating," "determining," "forwarding," "storing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to process data by a network element with a data processing pipeline, the method comprising:
   receiving network data;
   performing a policy-based routing lookup using one or more characteristics of the network data to retrieve a next hop identifier;
   generating a key for the next hop identifier;
   performing a longest prefix match lookup to retrieve a forwarding result using the key; and
   determining a next hop interface based on the forwarding result.

2. The machine-readable medium of claim 1, further comprising:
   forwarding the network data using the next hop interface.

3. The machine-readable medium of claim 1, wherein each of the one or more characteristics is selected from the group consisting of a received port identifier, source address, destination address, Internet Protocol, Layer 4 port, application identifier, packet attribute, and type of service identifier.

4. The machine-readable medium of claim 1, wherein the key is generated from an address indicator and next hop identifier.

5. The machine-readable medium of claim 4, wherein the address indicator is a multicast address indicator.

6. The machine-readable medium of claim 4, wherein the key is a 32-bit multicast prefix.

7. The machine-readable medium of claim 1, wherein the key does not overlap with other routes stored in a longest prefix match lookup table.

8. The machine-readable medium of claim 1, wherein the next hop identifier is a policy map identifier that identifies which policy map is used for this network data.

9. The machine-readable medium of claim 1, wherein the next hop interface is derived by applying at least one of Quality of Service and Access Control List policies.

10. A non-transitory machine-readable medium having executable instructions to cause one or more processing units to perform a method to program a longest prefix match lookup table with a data processing pipeline, the method comprising:
    receiving a policy-based routing forwarding information;
    storing a policy-based routing entry in a policy-based routing lookup table based on the policy-based routing forwarding information;
    generating a key associated with the policy-based routing entry; and
    storing a longest prefix match entry in a longest prefix match based on the key, wherein the longest prefix match entry includes a forwarding result.

11. A method to process data by a network element with a data processing pipeline, the method comprising:
    receiving network data;
    performing a policy-based routing lookup using one or more characteristics of the network data to retrieve a next hop identifier;
    generating a key for the next hop identifier;
    performing a longest prefix match lookup to retrieve a forwarding result using the key; and
    determining a next hop interface based on the forwarding result.

12. The method of claim 11, further comprising:
    forwarding the network data using the next hop interface.

13. The method of claim 11, wherein each of the one or more characteristics is selected from the group consisting of a received port identifier, source address, destination address, Internet Protocol, Layer 4 port, application identifier, packet attribute, and type of service identifier.

14. The method of claim 11, wherein the key is generated from an address indicator and next hop identifier.

15. The method of claim 14, wherein the address indicator is a multicast address indicator.

16. The method of claim 14, wherein the key is a 32-bit multicast prefix.

17. The method of claim 11, wherein the key does not overlap with other routes stored in a longest prefix match lookup table.

18. The method of claim 11, wherein the next hop identifier is a policy map identifier that identifies which policy map is used for this network data.

19. The method of claim 11, wherein the next hop interface is derived by applying at least one of Quality of Service and Access Control List policies.

20. A method to program a longest prefix match lookup table with a data processing pipeline, the method comprising:
   receiving a policy-based routing forwarding information;
   storing a policy-based routing entry in a policy-based routing lookup table based on the policy-based routing forwarding information;
   generating a key associated with the policy-based routing entry; and
   storing a longest prefix match entry in a longest prefix match based on the key, wherein the longest prefix match entry includes a forwarding result.

* * * * *